(12) United States Patent
Pistole et al.

(10) Patent No.: US 11,898,935 B2
(45) Date of Patent: Feb. 13, 2024

(54) TEST APPARATUS FOR SIMULATING OFF-ROAD CONDITIONS FOR VEHICLE

(71) Applicant: Ford Global Technologies, LLC, Dearborn, MI (US)

(72) Inventors: Timothy Pistole, Grosse Ile, MI (US); Mark Thomas Weston, Livonia, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 43 days.

(21) Appl. No.: 17/531,188

(22) Filed: Nov. 19, 2021

(65) Prior Publication Data

US 2023/0175928 A1 Jun. 8, 2023

(51) Int. Cl.
*G01M 17/007* (2006.01)

(52) U.S. Cl.
CPC .............. *G01M 17/0074* (2013.01)

(58) Field of Classification Search
CPC ................................................. G01M 17/0074
USPC ........................................ 73/116.01, 117.01
See application file for complete search history.

(56) References Cited

U.S. PATENT DOCUMENTS

| | | | |
|---|---|---|---|
| 1,970,825 A * | 8/1934 | Taylor | G01L 5/28 73/122 |
| 3,345,865 A * | 10/1967 | Ostrander | G01L 5/13 73/116.11 |
| 5,483,823 A * | 1/1996 | Shibayama | G01M 17/065 73/117.02 |
| 7,058,488 B2 | 6/2006 | Kemp et al. | |

FOREIGN PATENT DOCUMENTS

| | | | |
|---|---|---|---|
| CN | 202869826 | | 4/2013 |
| CN | 107436243 | | 12/2017 |
| CN | 112683549 A | * | 4/2021 |
| JP | 2017219524 A | * | 12/2017 |
| JP | 6596644 | | 10/2019 |
| WO | WO-2009039575 A1 | * | 4/2009 ............... G01L 3/16 |

OTHER PUBLICATIONS

Power Test, YouTube, Flat Deck Chassis Dynamometer, 2017, https://www.youtube.com/watch?v=P4LnX9doALM (Year: 2017).*
US Army Test and Evaluation Command Test Operations Procedure—2017 (Year: 2017).*

* cited by examiner

*Primary Examiner* — Eric S. McCall
*Assistant Examiner* — Timothy P Graves
(74) *Attorney, Agent, or Firm* — Burris Law, PLLC

(57) ABSTRACT

A test apparatus for simulating road conditions for a motor vehicle. The test apparatus includes a platform, a pair of roller assemblies, and a driveshaft. The pair of roller assemblies are coupled to the platform. Each pair of roller assemblies being configured to receive a pair of wheels of the motor vehicle. The driveshaft is secured between the pair of roller assemblies and is configured to transmit rotary power from one of the pair of roller assemblies to the other of the pair of roller assemblies. An orientation of the platform is adjustable.

20 Claims, 8 Drawing Sheets

US 11,898,935 B2

TEST APPARATUS FOR SIMULATING OFF-ROAD CONDITIONS FOR VEHICLE

FIELD

The present disclosure relates to a test apparatus for a vehicle, and more specifically to a test apparatus for simulating off-road conditions.

BACKGROUND

The statements in this section merely provide background information related to the present disclosure and may not constitute prior art.

Some vehicles such as pick-up trucks, for example, are capable of off-road driving. Such vehicles capable of off-road driving are typically tested in the field such as parks, for example, to provide for a variety of vehicle operating conditions that a vehicle operator is likely to encounter while driving off-road. Testing the vehicle in the field where the vehicle is outside may be less desirable for the original equipment manufacture (OEM). For example, when testing off-road vehicles having undisclosed technology in the field, the undisclosed technology runs the risk of being revealed by photographs taken by the viewing public. In another example, when testing off-road vehicles in the field, it is often difficult for repeatability of tests due to constant changes in the weather.

These issues related to testing of vehicles having off-road capabilities, among other issues related to such vehicles, are addressed by the present disclosure.

SUMMARY

This section provides a general summary of the disclosure and is not a comprehensive disclosure of its full scope or all of its features.

In one form, the present disclosure provides a test apparatus for simulating road conditions for a motor vehicle. The test apparatus comprises a platform, a pair of roller assemblies, and a driveshaft. The pair of roller assemblies are coupled to the platform. Each pair of roller assemblies being configured to receive a pair of wheels of the motor vehicle. The driveshaft is secured between the pair of roller assemblies and is configured to transmit rotary power from one of the pair of roller assemblies to the other of the pair of roller assemblies. An orientation of the platform is adjustable.

In variations of the test apparatus of the above paragraph, which may be implemented individually or in any combination: the pair of roller assemblies are partially disposed within the platform; a plurality of suspension devices, each suspension device secured at a first end to a respective corner of the platform and at a second end to a crane, the crane is configured to adjust the orientation of the platform; the orientation includes roll, pitch, yaw, and combinations thereof; the suspension devices are chains and the platform includes hooks secured to the chains; first and second roller devices, each of the first and second roller devices are configured to receive a respective wheel of the pair of wheels, and an axle secured to and between the first and second roller devices; a brake assembly associated with each of the first and second roller devices; the platform defines a cavity, the cavity housing the driveshaft and a portion of the pair of roller assemblies, and one or more cover plates removably secured to the platform and covering the driveshaft and the portion of the pair of roller assemblies; a plurality of tie-down devices secured to the platform and the motor vehicle and configured to secure the motor vehicle to the platform; and the tie-down devices are chains.

In another form, the present disclosure provides a test apparatus for simulating road conditions for a motor vehicle. The test apparatus comprises a platform, a pair of modular roller assemblies, and a driveshaft. The pair of modular roller assemblies are coupled to the platform. Each pair of modular roller assemblies being configured to receive a pair of wheels of the motor vehicle. The driveshaft is secured between the pair of roller assemblies and is configured to transmit rotary power from one of the pair of roller assemblies to the other of the pair of roller assemblies.

In variations of the test apparatus of the above paragraph, which may be implemented individually or in any combination: each of the first and second roller devices is configured to receive a respective wheel of the pair of wheels, an axle is secured to and between the first and second roller devices, and a cover plate is removably secured to the platform and covering the axle and a portion of the first and second roller devices; one or more cover plates are removably secured to the platform and cover the driveshaft; each roller assembly includes a differential operatively connected to the driveshaft and the axle; and the differential is an electronic limited slip differential.

In yet another form, the present disclosure provides a test apparatus for simulating road conditions for a motor vehicle. The test apparatus comprises a crane, a platform, a plurality of suspension devices, a pair of roller assemblies, and a driveshaft. Each suspension device is secured at a first end to a respective corner of the platform and at a second end to the crane. The pair of roller assemblies are coupled to the platform. Each pair of roller assemblies being configured to receive a pair of wheels of the motor vehicle. Each roller assembly includes first and second roller devices and an axle. Each of the first and second roller devices is configured to receive a respective wheel of the pair of wheels. The axle is secured between the first and second roller devices. The driveshaft is secured between the pair of roller assemblies and is configured to transmit rotary power from one of the pair of roller assemblies to the other of the pair of roller assemblies. The crane is configured to adjust an orientation of the platform.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
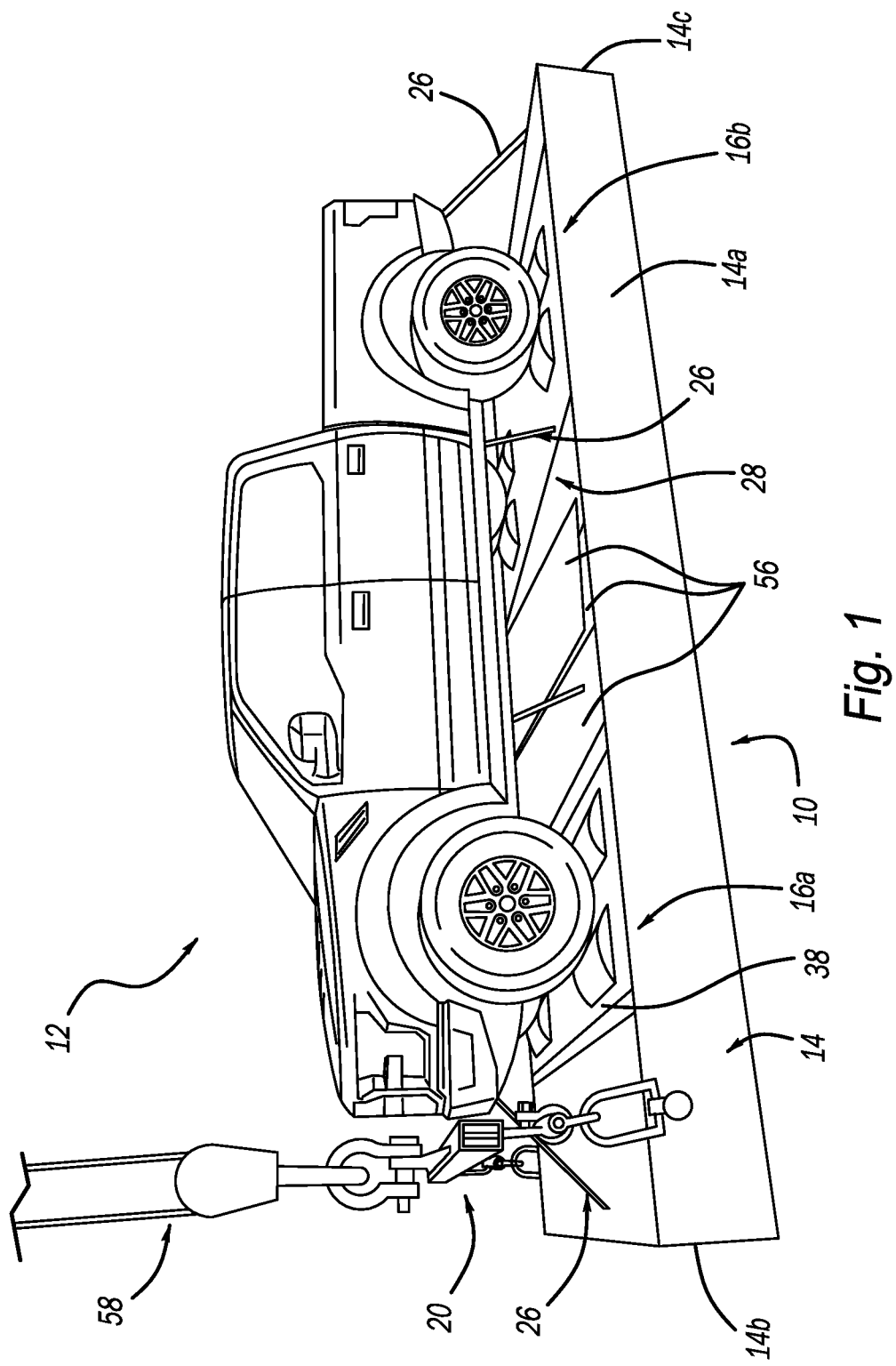
FIG. 1 is a perspective view of a test apparatus supporting a vehicle for simulating road conditions according to the principles of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIGS. 1-4 and 6, a test apparatus or test rig 10 for a vehicle 12 having first and second axles (not shown) is provided. The vehicle 12 may be a 2-wheel-drive vehicle (i.e., rear wheel drive (RWD) or a front wheel drive (FWD)) such that the first or primary axle includes first and second shafts (not shown) that drive a first set of wheels. In some configurations, the vehicle 12 may be a 4-wheel-drive (4WD) or all-wheel-drive (AWD) vehicle such that the second or secondary axle is also a drive axle and includes first and second shafts (not shown) that drive a second set of wheels. In other configurations, the vehicle 12 may be operable between a 2-wheel-drive mode in which first and second shafts (not shown) of a first axle (not shown) drive a first set of wheels, and a 4-wheel drive mode in which the first and second shafts of the first axle drive the first set of wheels and first and second shafts (not shown) of a second axle (not shown) drive a second set of wheels.

Generally, the test apparatus 10 simulates off-road conditions (pitch, roll, yaw, and combinations thereof as described in greater detail below), for example, for the vehicle 12. In the example illustrated, the test apparatus 10 is located within a building so as to provide privacy when simulating off-road conditions for the vehicle 12. Conducting such vehicle testing using the test apparatus 10 within the building also allows for repeatability of the testing due in part to the ability to control other testing conditions such as climate (e.g., temperature) within the building. In some forms, however, the test apparatus 10 is located outside (i.e., external to the building) when simulating off-road conditions for the vehicle 12. Although the vehicle 12 provided in FIG. 1 is a motor vehicle, it should be understood that the test apparatus 10 may simulate off-road conditions for electric vehicles such as battery electric vehicles (BEV), hybrid electric vehicles (HEV), plug-in electric vehicles (PHEV), or fuel cell vehicles, among others, for example.

Figure 2A:
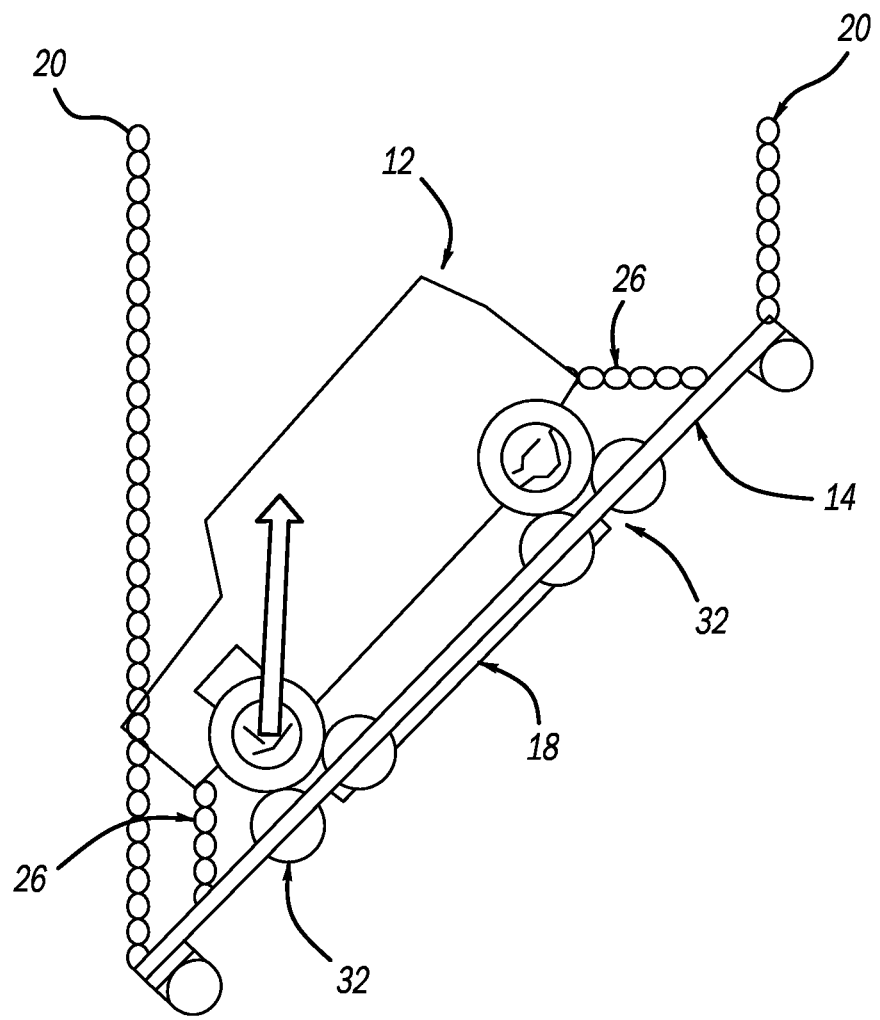
FIG. 2a is a perspective view of the test apparatus of FIG. 1 with the vehicle at a predetermined pitch.
Figure 4:
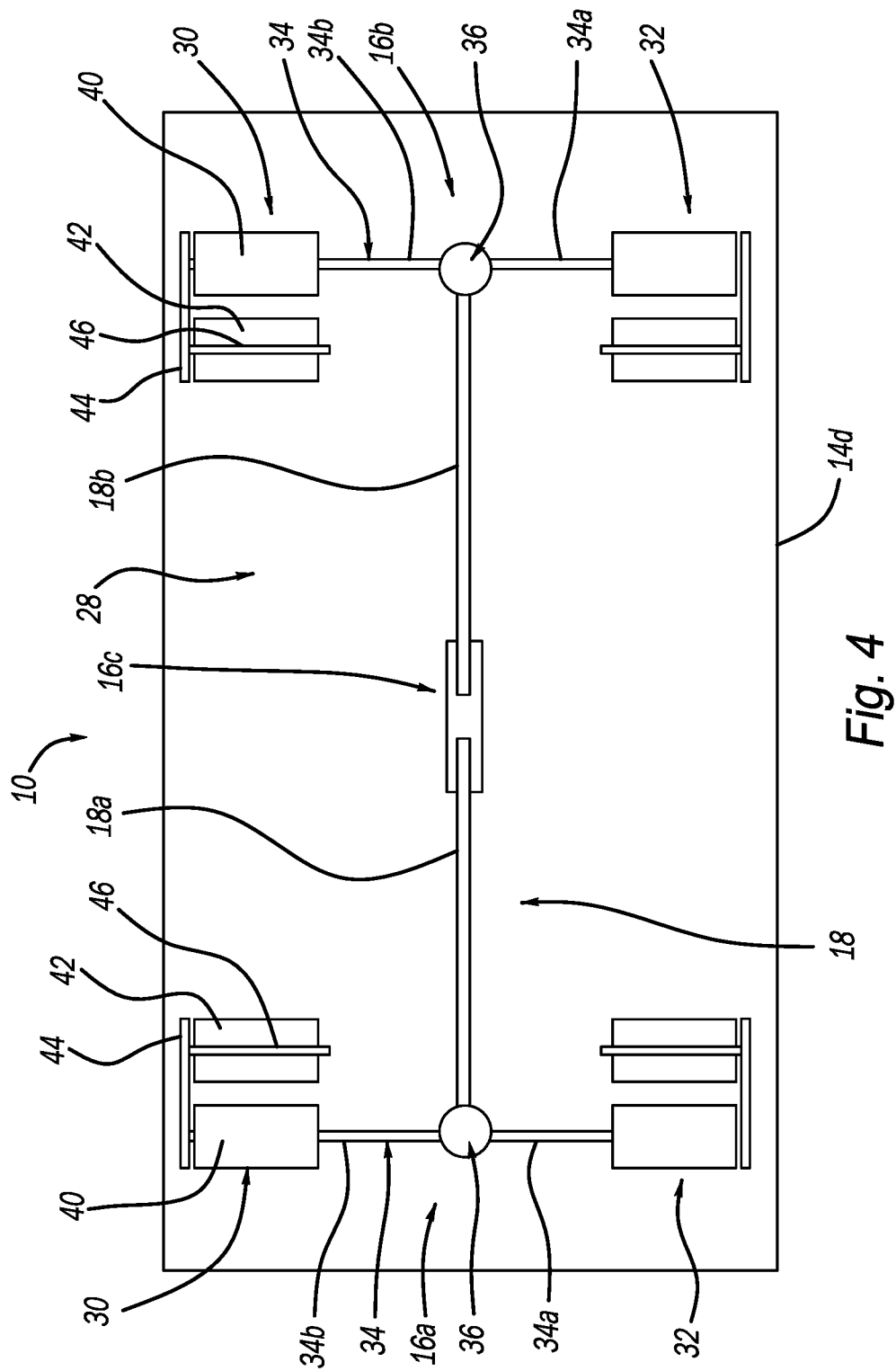
FIG. 4 is a schematic view of internal components of the test apparatus of FIG. 1.

The test apparatus 10 includes a platform 14, a pair of roller assemblies 16a, 16b, a driveshaft 18 (FIG. 4), a plurality of suspension devices 20 (FIGS. 1 and 2a) and a plurality of tie-down devices 26 (FIGS. 1 and 2). In the example illustrated, the platform 14 is rectangular shape and made of a metal material. The platform 14 includes opposing side walls or beams 14a, a front wall or beam 14b, a back wall or beam 14c, and a bottom wall 14d (FIG. 4) that are secured to each other and that cooperate to define a cavity 28 (FIGS. 1 and 4). The driveshaft 18 is disposed within the cavity 28 (i.e., the driveshaft 18 is disposed entirely within the cavity 28) and the pair of roller assemblies 16a, 16b are at least partially disposed within the cavity 28. The opposing side walls 14a, the front wall 14b, the back wall 14c, and the bottom wall 14d are secured to each other via mechanical fasteners or any other suitable attachment means such as via welding, for example. In some forms, the bottom wall 14d comprises a plurality of individual plates that are removably secured to the side walls 14a, for example, which allow for easy removal and access to internal components of the test apparatus 10.

Each roller assembly 16a, 16b is modular and is configured to receive pairs of wheels of the vehicle 12. That is, each roller assembly 16a, 16b is removably secured to the platform 14 at different attachment points along a length of the platform 14 (i.e., each roller assembly 16a, 16b is adjusted along the length of the platform 14). In this way, the test apparatus 10 accommodates vehicles of different sizes. For example, when simulating off-road conditions for a pick-up truck, each roller assembly 16a, 16b may be located further away from each other (i.e., closer toward front and back walls 14b, 14c of the platform 14) compared to when simulating off-road conditions for a compact vehicle (e.g., sedan) where each roller assembly 16a, 16b may be located closer toward each other (i.e., closer towards a center of the platform 14). Additionally, the modular roller assemblies 16a, 16b allow for conveniently swapping out parts of the test apparatus 10 without the need to completely disassemble or replace the entire test apparatus 10.

Figure 2B:
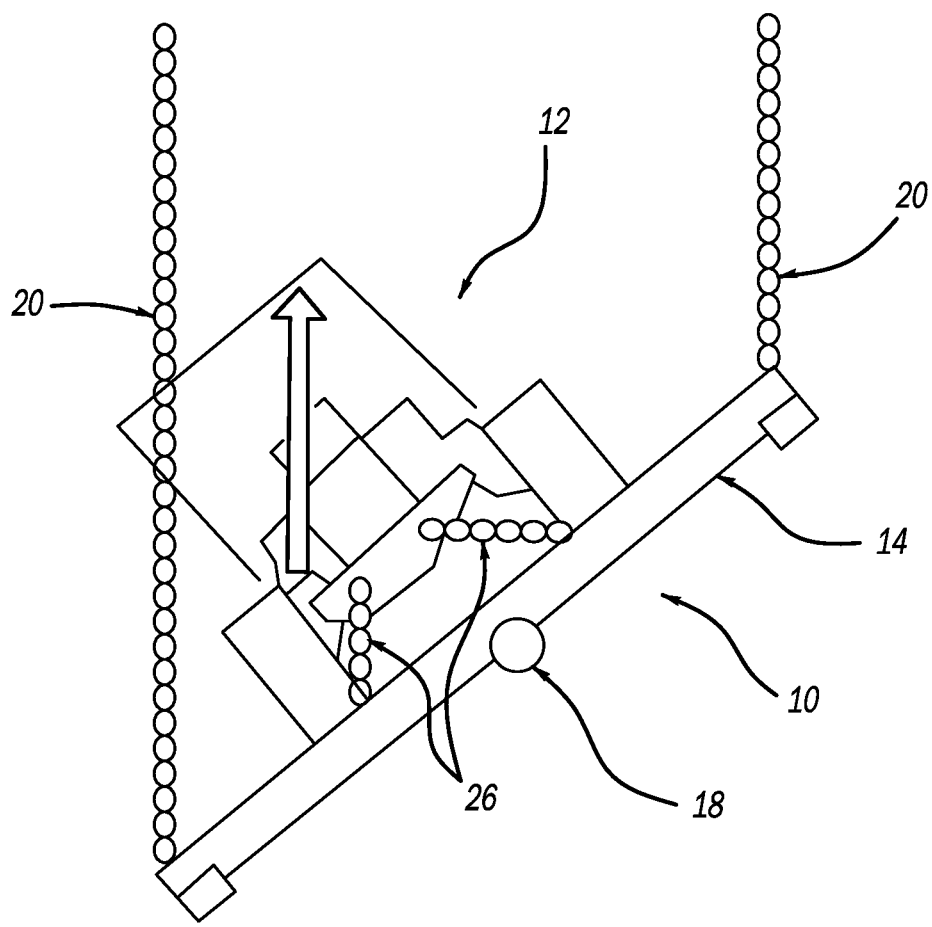
FIG. 2b is a perspective view of the test apparatus of FIG. 1 with the vehicle at a predetermined roll.
Figure 2C:
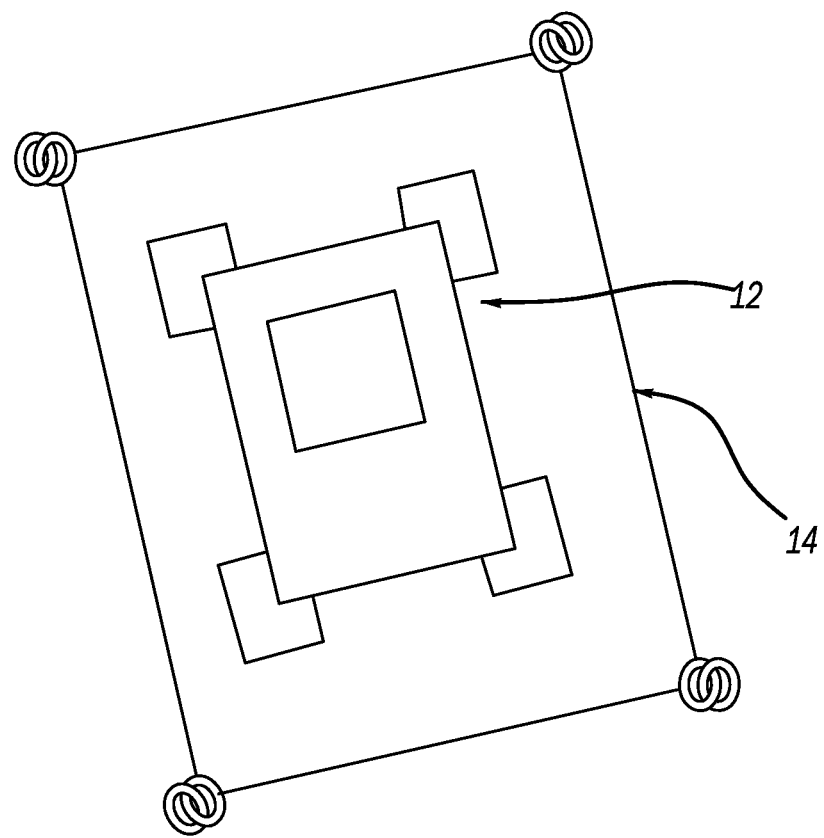
FIG. 2c is a perspective view of the test apparatus of FIG. 1 with the vehicle at a predetermined yaw.
Figure 3:
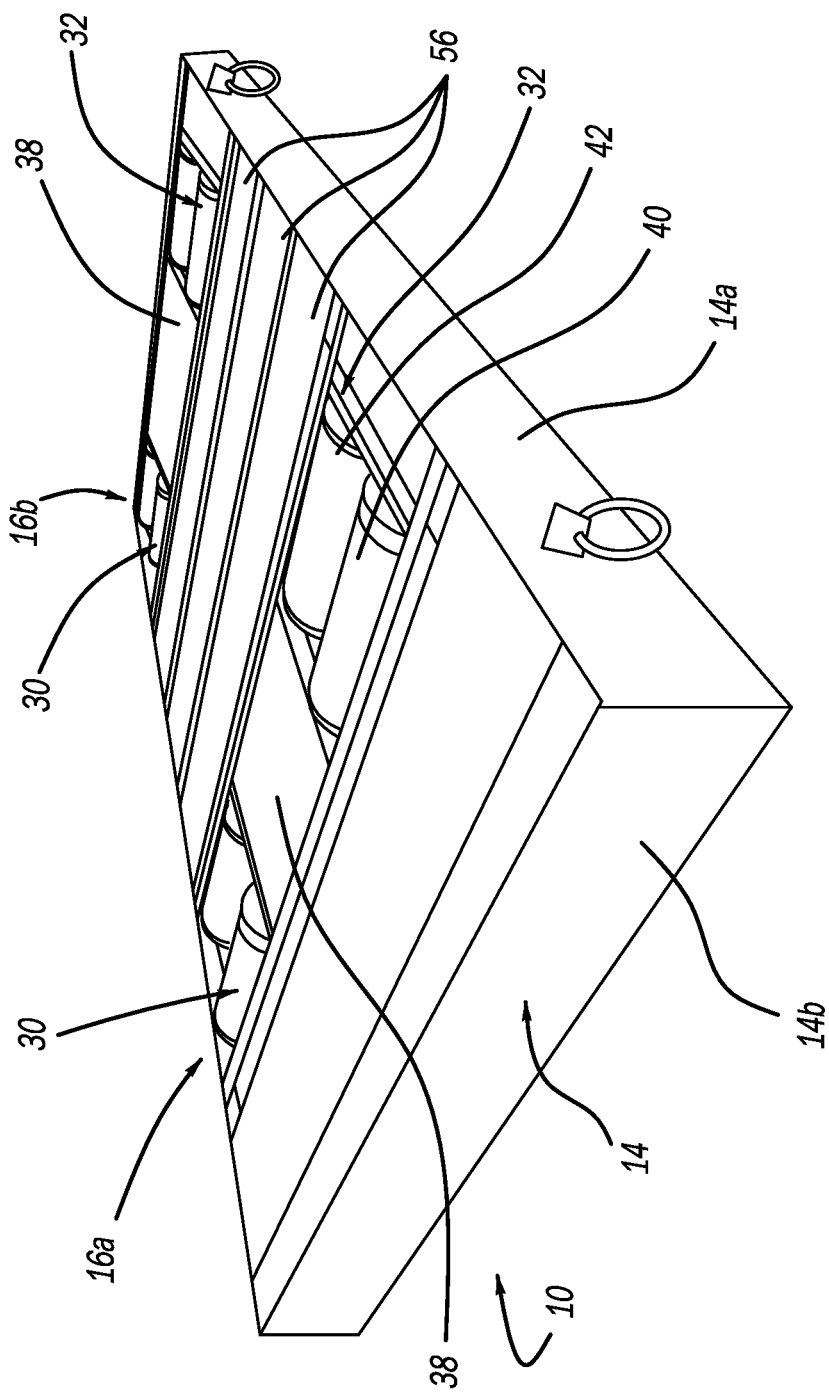
FIG. 3 is a perspective view of the test apparatus of FIG. 1 with the vehicle removed for clarity.

Each roller assembly 16a, 16b includes first and second roller devices 30, 32, an axle 34 (FIG. 4), a differential 36 (FIG. 4), and a cover plate 38 (FIGS. 1-3). Each of the first and second roller devices 30, 32 are configured to receive a respective wheel of the pair of wheels and are located at or near opposing side walls 14a of the platform 14. When the vehicle 12 is a 4WD or AWD vehicle, for example, the drivetrain system of the vehicle 12 is allowed to disperse power to each of the first and second roller devices 30, 32 of the roller assemblies 16a, 16b independently. Each of the first and second roller devices 30, 32 includes a first or primary drum 40, a second or secondary drum 42, a transmission element 44 (FIG. 4), and a secondary drum axle 46 (FIG. 4). The first and second drums 40, 42 are partially disposed within the cavity 28 of the platform 14 and extend through a cut-out of a pair of cut-outs of the cover plate 38 such that portions of the first and second drums 40, 42 are located above the cover plate 38. The first drum 40 includes opposing end caps that are secured to the cover plate 38 via mechanical fasteners, for example. In this way, the end caps 50 rotatably support the first drum 40. The first drum 40 is splined to a respective shaft 34a, 34b of the axle 34 such that the first drum 40 is fixed for rotation with the respective shaft 34a, 34b. The first drum 40 also rotates about an axis of the respective shaft 34a, 34b. The second drum 42 includes opposing end caps that are secured to the cover plate 38 via mechanical fasteners, for example. In this way, the end caps 52 rotatably support the second drum 42. The second drum 42 is splined to the secondary drum axle 46 such that the second drum 42 is fixed for rotation with the secondary drum axle 46. The second drum 42 also rotates about an axis of the secondary drum axle 46. In some forms, each of the first and second drums 40, 42 and/or the axle 34 may include a resistance device (not shown) such as an eddy current absorber. In this way, the drums 40, 42 and/or the axle 34 may change wheel loading conditions (i.e., create resistance to the rotation of the drums 40, 42).

The transmission element 44 is supported by and meshingly engaged with a hub (not shown) that is, in turn, meshingly engaged with the respective shaft 34a, 34b and the secondary drum axle 46. In this way, rotary power from the first drum 40 is transmitted to the second drum 42. The transmission element 44 may be a chain or a belt, for example, or any other suitable transmission means for transmitting rotatory power between objects. The secondary drum axle 46 is spaced apart from the axle 34 and extends parallel to the axle 34. In some forms, the transmission element 44 may be omitted such that the drum 42 rotates freely around the drum axle 46.

As shown in FIG. 4, the axle 34 is secured to and between the first drums 40 of the first and second roller devices 30, 32 and extends transverse to a longitudinal direction of the platform 14. In some forms, the axle 34 may be secured to and between the second drums 42 of the first and second roller devices 30, 32 instead of the first drums 40 and extends transverse to the longitudinal direction of the platform 14. The axle 34 includes the first shaft 34a that is secured to the first drum 40 of the first roller device 30 and the second shaft 34b that is secured to the first drum 40 of the second roller device 32.

Figure 5:
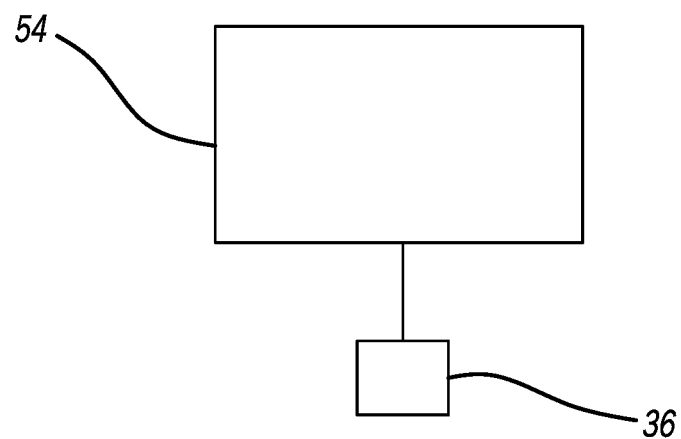
FIG. 5 is a block diagram showing components of the test apparatus of FIG. 1.
Figure 6:
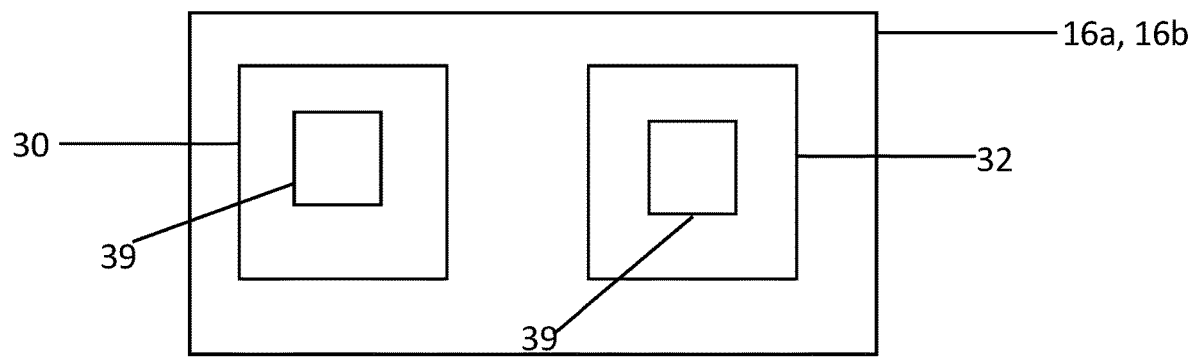
FIG. 6 is another block diagram showing components of the test apparatus of FIG. 1.

The differential 36 is operatively connected to the driveshaft 18 and the first and second shafts 34a, 34b of the axle 34, and allows the first and second shafts 34a, 34b to rotate at the same speed or at different speeds. The differential 36 may be any type of controllable differential such as an electronic limited slip differential that is in communication with a controller 54 (FIG. 5). The differential 36 is operable in a first differential mode in which the first shaft 34a and the second shaft 34b are allowed to rotate at different speeds, and a second differential mode in which the differential 36 inhibits relative rotation between the first shaft 34a and the second shaft 34b. For example, the first differential mode can be an open differential mode and the second differential mode can be a limited slip differential mode or a locked differential mode.

The differential 36 may be any suitable type of differential. In one form, the differential 36 has a planetary differential gearset and include, inter alia, a driveshaft (not shown), a housing (not shown), a ring gear (not shown), one or more planet gears (not shown), first and second side gears (not shown), and a clutch (not shown). The driveshaft connects to the driveshaft 18. An input gear (not shown) is connected to the driveshaft. The input gear is a separate component that is secured to the driveshaft or may be an integral part of the driveshaft. The input gear is configured to mesh with the ring gear. The planet gears is connected to the ring gear and meshes with the first and second side gears. The first side gear is connected to the first shaft 34a. The first side gear is a separate component that is secured to the first shaft 34a or may be an integral part of the first shaft 34a. The second side gear is connected to the second shaft 34b. The second side gear is a separate component that is secured to the second shaft 34b or may be an integral part of the second shaft 34b.

The clutch (not shown) can be any suitable type of clutch that is operable to selectively permit or inhibit relative rotation between the first and second shafts 34a, 34b. In one form, the clutch (not shown) includes a set of plates (not shown) associated with (e.g., secured to) the housing (not shown) and a set of discs (not shown) associated with (e.g., secured to) at least one of the first and second shafts 34a, 34b. When the set of plates and the set of discs are disengaged from each other, the differential 36 is in the first differential mode and acts as an open differential. When the set of plates and the set of discs are engaged with each other, the differential 36 is in the second differential mode and acts as a limited slip differential. It should be understood that although the differential 36 is described above as a clutch-type limited slip differential, the differential 36 may be other suitable differentials.

As shown in FIGS. 1-3, the cover plate 38 extends in a traverse direction relative to the longitudinal direction of the platform 14 and is removably secured to the opposing side walls 14a of the platform 14. The cover plate 38 covers or shields the axle 34, the differential 36, and portions of the first and second roller devices 30, 32 contained within the cavity 28 of the platform 14 from objects or fluids external to the cavity 28 during vehicle testing. The cover plate 38 includes the pair of cutouts that the first and second drums 40, 42 of the first and second roller devices 30, 32 extend through.

As shown in FIG. 4, the driveshaft 18 is disposed within the cavity 28 of the platform 14 and extends parallel to the longitudinal direction of the platform 14. The driveshaft 18 is secured between the pair of roller assemblies 16a, 16b and is configured to transmit rotary power from one of the pair of roller assemblies 16a, 16b to the other of the pair of roller assemblies 16a, 16b. For example, when the vehicle 12 is a RWD vehicle, the rear wheels causes rotation of the drums 40, 42 of the first and second roller devices 30, 32 of the roller assembly 16b, which, in turn, causes rotation of the drums 40, 42 of the first and second roller devices 30, 32 of the roller assembly 16a via the driveshaft 18, the differentials 36, and the axles 34. Rotation of the drums 40, 42 of the first and second roller devices 30, 32 of the roller assembly 16a drives the front wheels of the vehicle 12, therefore, accurately simulating off-road conditions of both sets of wheels of the RWD vehicle using the test rig 10. In some forms, each roller device 30, 32 of the roller assemblies 16a, 16b includes a braking assembly 39 that is applied when the user or robot applies the brakes of the vehicle, thereby reducing the rotational speed of the drums 40, 42 of the roller devices 30, 32 of the roller assemblies 16a, 16b. The brake assembly 39 may be a disc brake or a drum brake, for example.

The driveshaft 18 includes a first portion 18a connected to the differential 36 of the roller assembly 16a, a second portion 18b connected to the differential 36 of the roller assembly 16b, and a coupler 16c positioned between the first and second portions 18a, 18b. The coupler 16c may be a dog clutch, for example. The coupler 16c is movable between a first or engaged position in which the first and second portions 18a, 18b are fixed for rotation with each other, and a second or disengaged position in which the first and second portions 18a, 18b rotate relative to each other. For example, the coupler 16c is in the engaged position when the vehicle being tested is a 2-wheel-drive vehicle such that rotatory power from the drivable wheels are transmitted to the non-drivable wheels via the driveshaft 18. In another example, the coupler 16c is in the disengaged position when the vehicle being tested is a 4WD or AWD vehicle. The coupler 16c is movable between the first and second positions manually or automatically using the controller 54. One or more cover plates 56 (FIGS. 1-3) are removably secured to the platform 14, and cover or shield the driveshaft 18 contained within the cavity 28 of the platform 14 from objects or fluids external to the cavity 28 during vehicle testing.

As shown in FIGS. 1 and 2, each suspension device 20 is secured at a first end to a respective corner of the platform 14 (i.e., secured to an attachment feature such as a D-ring fixed to a respective side wall 14a of the platform 14) and at a second end to a lift 58. Although only two suspension devices 20 are shown secured at or near the front wall 14b of the platform 14 in FIGS. 1 and 2, the testing rig 10 may include four suspension devices, for example, secured to a respective corner of the four corners of the platform 14. The suspension devices 20 may be chains, cables, pulleys or a combination thereof. In some forms, the suspension devices may be any other suitable suspension means for suspending the platform 14 including the vehicle 12 partially or entirely above a ground surface.

In the example illustrated, the lift 58 is an overhead crane that operates to adjust an orientation of the platform 14 and the vehicle 12. For example, the lift 58 adjusts the orientation of the platform 14 such as the yaw, roll, pitch or combinations thereof. The pitch angle may be such that the fore end of the vehicle 12 is inclined at a 45-degree angle, for example, with respect to the ground surface (nose-up scenario). In another example, the pitch angle may be such that the aft end of the vehicle 12 is inclined at a 45-degree angle, for example, with respect to the ground surface (FIG. 2a; nose-down scenario). In another example, the roll angle may be such that a left or right side of the vehicle 12 is rolled at a predetermined angle, for example, with respect to the ground surface (FIG. 2b). The predetermined angle may be 40 degrees, for example. In yet another example, the vehicle 12 and platform 14 are oriented at a predetermined yaw (FIG. 2c). In some examples, the vehicle 12 and the platform 14 may be oriented with a pitch angle and a roll angle. That is, the vehicle 12 and the platform 14 are inclined at a 45-degree nose down scenario and a 10-degree roll angle.

As shown in FIGS. 1 and 2, the plurality of tie-down devices 26 are configured to secure the vehicle 12 to the platform 14. The tie-down devices 26 may be chains, cables, or any other suitable securement means for securing the vehicle 12 to the platform 14.

The testing rig 10 of the present disclosure provides the benefit of accurately simulating off-road conditions of the vehicle 12 at a plurality of operating conditions. In this way, engine oil pick-up, turbo oil injection, transmission oil pick-up, fuel pick-up, shift quality, and a variety of other vehicle operation conditions can all be tested.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A test apparatus for simulating off-road conditions for a motor vehicle, the test apparatus comprising:
   a platform;
   front and rear roller assemblies coupled to the platform, each of the front roller assembly and the rear roller assembly being configured to receive a pair of wheels of the motor vehicle, the front roller assembly located near a front end of the platform and the rear roller assembly located entirety rearward of the front roller assembly near a rear end of the platform; and
   a driveshaft secured between the front roller assembly and the rear roller assembly and configured to transmit rotary power from one of the front roller assembly and the rear roller assembly to the other of the front roller assembly and the rear roller assembly, the driveshaft extends parallel to a longitudinal direction of the platform,
   wherein an orientation of the platform is adjustable, and
   wherein the driveshaft includes a first portion, a second portion, and a clutch positioned between the first and second portions and movable between a first position in which the first and second portions are fixed for rotation with each other, and a second position in which the first and second portions rotate relative to each other.

2. The test apparatus of claim 1, wherein the front roller assembly and the rear roller assembly are partially disposed within the platform.

3. The test apparatus of claim 1, further comprising:
   a crane; and
   a plurality of suspension devices, each suspension device secured at a first end to a respective corner of the platform and at a second end to the crane,
   wherein the crane is configured to adjust the orientation of the platform.

4. The test apparatus of claim 3, wherein the orientation includes roll, pitch, yaw, and combinations thereof.

5. The test apparatus of claim 3, wherein the suspension devices are chains and the platform includes hooks secured to the chains.

6. The test apparatus of claim 1, wherein each of the front roller assembly and the rear roller assembly includes:
   first and second roller devices, each of the first and second roller devices configured to receive a respective wheel of the pair of wheels; and
   an axle secured to and between the first and second roller devices.

7. The test apparatus of claim 6, further comprising a brake assembly associated with each of the first and second roller devices.

8. The test apparatus of claim 1, wherein:
   the platform defines a cavity, the cavity housing the driveshaft and a portion of each of the front roller assembly and the rear roller assembly; and
   one or more cover plates removably secured to the platform and covering the driveshaft and the portion of each of the front roller assembly and the rear roller assembly.

9. The test apparatus of claim 1, further comprising a plurality of tie-down devices secured to the platform and the motor vehicle and configured to secure the motor vehicle to the platform.

10. The test apparatus of claim 9, wherein the tie-down devices are chains.

11. A test apparatus for simulating off-road conditions for a motor vehicle, the test apparatus comprising:
   a platform;
   front and rear modular roller assemblies coupled to the platform, each of the front modular roller assembly and the rear modular roller assembly is adjustable along a length of the platform and being configured to receive a pair of wheels of the motor vehicle, the front modular roller assembly located near a front end of the platform and the rear modular roller assembly located entirely rearward of the front modular roller assembly near a rear end of the platform; and
   a driveshaft secured between the front modular roller assembly and the rear modular roller assembly and configured to transmit rotary power from one of the front modular roller assembly and the rear modular roller assembly to the other of the front modular roller assembly and the rear modular roller assembly, the driveshaft extends parallel to a longitudinal direction of the platform,
   wherein the driveshaft includes a first portion, a second portion, and a clutch positioned between the first and second portions and movable between a first position in which the first and second portions are fixed for rotation with each other, and a second position in which the first and second portions rotate relative to each other.

12. The test apparatus of claim 11, wherein each of the front modular roller assembly and the rear modular roller assembly includes:
   first and second roller devices, each of the first and second roller devices configured to receive a respective wheel of the pair of wheels;
   an axle secured to and between the first and second roller devices; and
   a cover plate removably secured to the platform and covering the axle and a portion of the first and second roller devices.

13. The test apparatus of claim 12, further comprising a brake assembly associated with each of the first and second roller devices.

14. The test apparatus of claim 11, further comprising:
   a crane; and
   a plurality of suspension devices, each suspension device secured at a first end to a respective corner of the platform and at a second end to the crane,
   wherein the crane is configured to adjust an orientation of the platform.

15. The test apparatus of claim 14, wherein the orientation includes roll, pitch, yaw, and combinations thereof.

16. The test apparatus of claim 11, further comprising one or more cover plates removably secured to the platform and covering the driveshaft.

17. The test apparatus of claim 11, wherein each of the front modular roller assembly and the rear modular roller assembly includes:
   first and second roller devices, each of the first and second roller devices configured to receive a respective wheel of the pair of wheels; and
   an axle secured to and between the first and second roller devices.

18. The test apparatus of claim 17, wherein each of the front modular roller assembly and the rear modular roller assembly includes a differential operatively connected to the driveshaft and the axle.

19. The test apparatus of claim 18, wherein the differential is an electronic limited slip differential.

20. A test apparatus for simulating off-road conditions for a motor vehicle, the test apparatus comprising:
   a crane;
   a platform;
   a plurality of suspension devices, each suspension device secured at a first end to a respective corner of the platform and at a second end to the crane,
   a pair of roller assemblies coupled to the platform, each one of the pair of roller assemblies being configured to receive a pair of wheels of the motor vehicle, each roller assembly includes:
      first and second roller devices, each of the first and second roller devices configured to receive a respective wheel of the pair of wheels; and
      an axle secured between the first and second roller devices; and
   a driveshaft secured between the pair of roller assemblies and configured to transmit rotary power from one of the pair of roller assemblies to the other of the pair of roller assemblies,
   wherein the crane is configured to adjust an orientation of the platform and,
   wherein the driveshaft includes a first portion, a second portion, and a clutch positioned between the first and second portions and movable between a first position in which the first and second portions are fixed for rotation with each other, and a second position in which the first and second portions rotate relative to each other.

* * * * *